May 30, 1939.    H. C. BATES    2,160,571
GLASS FILTER AND METHOD OF MAKING IT
Filed May 28, 1936
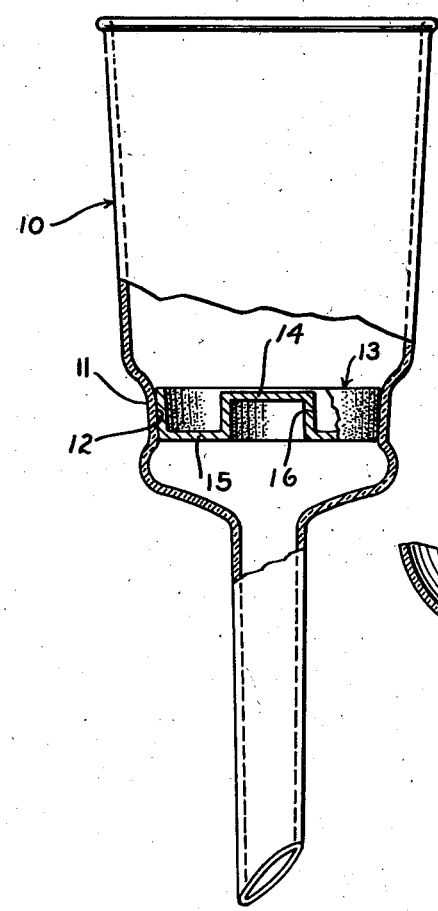
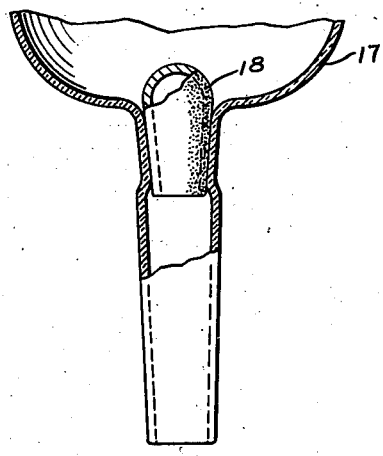
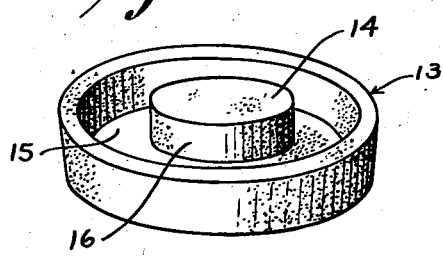
INVENTOR.
HARRY C. BATES
BY Dorsey & Cole
ATTORNEYS.

Patented May 30, 1939

2,160,571

UNITED STATES PATENT OFFICE 2,160,571

GLASS FILTER AND METHOD OF MAKING IT

Harry Clifford Bates, Corning, N. Y., assignor to Corning Glass Works, Corning, N. Y., a corporation of New York Application May 28, 1936, Serial No. 82,341

3 Claims. (Cl. 210—112)

This invention relates to the refining of liquids, and more particularly to the filtering of liquids such as the various acid and chemical solutions commonly employed in industry.

In the process of refining chemical containing solutions it is imperative that a device used for such purpose be constructed of materials resistant to attack by the liquid being filtered.

In the manufacture of such devices, glass has long been accepted as a most practical material, both from the standpoint of economy and because of its chemically resistant properties.

The object of my invention is to render liquids free from contamination by foreign substances, such as cement compounds often used in the construction of glass filters to bond the granular members of the filtering plate and to hold the plate in the body of the filter.

A further object is the rapid filtering of chemical solutions and the like in a receptacle impervious to acid attack.

My invention embodies among its features a hollow glass body having a constricted lower portion, the inner face of which is tapered to provide a seat for a similarly tapered filter plate, said filter plate and its cooperating seat having ground contacting surfaces to produce a substantially leak-tight joint.

A further feature is a filter plate having a relatively large filtering surface, compared to its diameter, and so shaped as to facilitate the grinding of the filter plate in place against the seat during the process of manufacture.

My invention is illustrated in the accompanying drawing in which,

Fig. 1 is an elevation, partly in section, showing the preferred construction of my invention;

Fig. 2 is a perspective view of the filter plate shown in Fig. 1; and

Fig. 3 is a fragmentary section showing an alternative form of construction of my filtering device.

Referring to the drawing in detail, and particularly to Fig. 1, a funnel-shaped receptacle, generally designated 10, and preferably constructed of glass, is provided with a constricted lower portion 11, the inner face of which is sufficiently tapered to provide a seat 12 for the support of a similarly tapered porous filter plate generally designated 13. This filter plate is preferably constructed of sintered glass, the manufacture of which is well known and briefly consists of applying sufficient heat to fine glass particles to cause partial fusion and cohesion.

The filter plate 13 (Figs. 1 and 2) is provided with a raised center portion 14. Extending downwardly therefrom and connecting with a base 15 is a wall 16 of approximately the same thickness as the base 15 and the raised portion 14.

By examination of the drawing and particularly the cross-sectional view of the filter plate 13, as shown in Fig. 1, it becomes obvious that as sufficient liquid is poured into the receptacle to completely cover the filter plate 13, filtration will occur through the raised portion 14, the base 15 and the wall 16. It will also be seen that by increasing or decreasing the height of the wall 16 the rate of filtration may be correspondingly changed.

As previously mentioned, the filter plate 13 is seated on a ground contacting surface 12 of the hollow glass body 10. In this connection it will be noted that while the wall 16 of the raised center portion 14 provides added filtering area, it also provides a convenient surface for seizure by a chuck or other suitable mechanical device used to effect the rotation of plate 13 in grinding it into seat 12.

In the alternative form of the invention, illustrated in Fig. 3, the outer body 17 is spherical in shape, while the filtering element 18 is shown in the form of a thimble. In this construction it is evident that the dome shape of the upper end of the thimble 18 provides a much greater filtering area than provided by the usual flat type of filter unit and at the same time also provides a suitable surface for seizure by a chuck.

While I have shown and described the preferred embodiments of my invention, it is to be understood that I do not wish to limit such invention to the particular forms shown in the drawing and that minor changes in detail may be resorted to without departing from the spirit and scope of the invention as claimed.

I claim:

1. In a filter assembly suitable for use in filtering acids and like corrosion liquids, a hollow glass body for receiving fluids to be filtered, a hollow glass filter element of porous material having a tapered wall through the medium of which it is supported on a tapered wall portion of said body, and an upwardly extended hollow portion of said element which increases its filtering surface and also serves as a portion of the element which may be seized to enable grinding of the tapered wall surfaces to obtain a fluid tight fit between them.

2. A porous filter unit suitable for filtering acids and like corrosive liquids consisting of two upstanding cylindrical wall portions composed of glass arranged concentrically with their corresponding ends integral with a flat bottom portion, the oppositely disposed end of the inner of such cylinders being integral with a flat closed portion, and the exterior wall surface of the outer of said cylinders being tapered so as to serve as a supporting surface for the unit.

3. In a filter assembly suitable for filtering acids and like corrosive liquids, a first hollow body of porous glass having a tapered exterior, a second hollow body of glass supporting the first and having an interior wall surface following the contour of and in ground contactual relation with the exterior wall surface of said first body.

HARRY CLIFFORD BATES.